United States Patent Office 3,086,920
Patented Apr. 23, 1963

3,086,920
DEHYDROGENATION OF STEROIDS BY MICRO-
ORGANISMS OF THE GENUS MICROCOCCUS
Masao Isono and Matazo Abe, Nishinomiya, Japan, assignors to Takeda Pharmaceutical Industries, Ltd., Osaka, Japan
No Drawing. Original application Aug. 18, 1959, Ser. No. 834,415. Divided and this application Nov. 21, 1961, Ser. No. 160,386
Claims priority, application Japan Aug. 18, 1958
6 Claims. (Cl. 195—51)

This invention relates to a process for preparing $\Delta^1$-dehydrosteroids by the use of microorganisms of the genus Micrococcus or enzyme produced by them.

For a long time the present inventors have been searching for those microorganisms which are able to form a double bond between the positions 1 and 2 in ring A of steroids, thereby producing $\Delta^1$-dehydrosteroids, and found that many microorganisms belonging to the genus Micrococcus have excellent ability to achieve the desired purpose.

The present invention has been accomplished based on the new finding and further studies and relates to a process for preparing $\Delta^1$-dehydrosteroids which is characterized by bringing steroids belonging to the pregnane or androstane series, in which the positions 1 and 2 in the steroid skeleton are saturated with hydrogen, into contact with the culture of microorganisms belonging to the genus Micrococcus or with the oxidase produced by the microorganisms.

The starting materials used in the method of this invention are those saturated or unsaturated steroids belonging to the pregnane or androstane series, in which the positions 1 and 2 in ring A are saturated with hydrogen and positions other than 1 and 2 may be substituted by an oxo, hydroxyl, halogeno, carboxyl, alkyl group or the like, and the hydroxyl group may be protected in the form of ether or ester and the oxo group in the form of ketal, hydrazone or semicarbazone.

Typical ones of these steroids are as follows.

$\Delta^{4,11}$-pregnadiene-3,20-dione
$\Delta^4$-pregnene-3,20-dione
$\Delta^4$-pregnen-11 (or 12,14,17 or 21)-ol-3,20-dione
$\Delta^4$-pregnen-14 (or 17 or 21)-ol-3,11,20-trione
$\Delta^4$-pregnene-17,21-diol-3,20-dione
$\Delta^4$-pregnene-17,21-diol-3,11,20-trione
$\Delta^4$-pregnene-11,21-diol-3,20-dione
$\Delta^4$-pregnene-11,17,21-triol-3,20-dione
$\Delta^4$-pregnene-11,16,17,21-tetrol-3,20-dione
6 and/or 9-(di)fluoro-$\Delta^4$-pregnene-11,17,21-triol-3,20-dione
6-methyl-$\Delta^4$-pregnene-17,21-diol-3,11,20-trione
$\Delta^4$-pregnene-17,19,21-triol-3,20-dione
$\Delta^4$-pregnene-11,20,21-triol-3-one
Allopregnane-3,20-dione
Androstane-3,17-dione
$\Delta^4$-androsten-17-ol-3-one
$\Delta^4$ (or $\Delta^5$-androstene-3,17-dione)
$\Delta^4$-androstene-3,11,17-trione Or their derivatives produced by changing their hydroxyl group into ester, ether, or halogenide and their oxo group into ketal, hydrazone, or semicarbazone.

As mentioned before, many microorganisms belonging to the genus Micrococcus can be used in the method of this invention, but it is desirable to select those microorganisms which have excellent catalytic activity for dehydrogenation.

Microorganisms especially suitable for the dehydrogenation of steroids are as follows, for example.

Micrococcus sp. IFO No. 3769
Micrococcus sp. IFO No. 3770
Micrococcus sp. IFO No. 3771
Micrococcus roseus Flügge The names of the genus of the above microorganisms are all based on "Bergey's Manual of Determinative Bacteriology," 7th edition, published by The Williams and Wilkins Co., Baltimore, Md., U.S.A., in 1957. Those microorganisms which lack in species name were separated by the present inventors and deposited in Institute for Fermentation, Osaka, Osaka, Japan under the number of IFO, respectively, and their microbial characteristics are as follows:

Micrococcus sp. IFO No. 3769.
 Spheres, 0.8–1.2 microns in diameter, occurring singly, in pairs, and in clumps. Endospore not formed. Non-motile. Gram-positive.
 Gelatin stab: No liquefaction.
 Agar slant: Luxuriant, smooth, filiform, sulfur-yellow growth.
 Broth: Turbid.
 Litmus milk: Alkaline.
 Potato: Yellow streak.
 Indole not produced.
 Hydrogen sulfide produced.
 No acid and gas from glucose.
 Starch not hydrolyzed.
 Methyl red and Voges-Proskauer test negative.
 Citrates, p-hydroxybenzoates, phenylacetates are utilized as sole source of carbon.
 Utilizes $NH_4H_2PO_4$ as a source of nitrogen.
 Nitrites produced from nitrates.
 Catalase-positive.
 Aerobic.

Micrococcus sp. IFO No. 3770.
 Spheres, 0.8–1.0 micron in diameter, occurring singly, in pairs, and in clumps. Endospore not formed. Non-motile. Gram-positive.
 Gelatin stab: No liquefaction.
 Agar slant: Smooth, filiform, yellow growth.
 Broth: Turbid.
 Litmus milk: Alkaline.
 Potato: Yellow streak.
 Indole not produced.
 Hydrogen sulfide produced.
 No acid and gas from glucose.
 Starch not hydrolyzed.
 Methyl red and Voges-Proskauer tests negative.
 Unable to utilize citrates as sole source of carbon.
 Utilizes $NH_4H_2PO_4$ as a nitrogen source, and p-hydroxybenzoates, phenylacetates as sole carbon sources.
 Nitrites produced from nitrates.
 Catalase-positive.
 Aerobic.

Micrococcus sp. IFO No. 3771.
 Spheres, 1.0–1.2 microns in diameter, occurring singly, in pairs, and in clumps. Endospore not formed. Non-motile. Gram-positive.
 Gelatin stab: Slow crateriform liquefaction.
 Agar slant: Smooth, filiform, yellowish white growth.
 Broth: Turbid.
 Litmus milk: Alkaline.
 Potato: Scant growth.
 Indole not produced.
 Hydrogen sulfide produced.
 No acid and gas from glucose.
 Starch not hydrolyzed.
 Methyl red and Voges-Proskauer tests negative.

Citrates, p-hydroxybenzoates, phenylacetates are utilized as sole source of carbon.

Utilizes $NH_4H_2PO_4$ as a source of nitrogen.

Nitrites produced from nitrates.

Catalase-positive.

Aerobic.

In general, the incubation of microorganisms in this method is effected under the conditions of oxidizing fermentation.

Nutrient media suitable for the growth of microorganisms contain carbon source, nitrogen source assimilable by the microorganisms, and necessary inorganic salts. As carbon source are used glucose, sucrose, dextrin, starch, and glycerin, for example and as nitrogen source are employed nitrogen containing organic substances such as peptone, meat extract, casein, edamine, corn steep liquor, yeast, and yeast extract, organic compounds such as amino acids, ammonium salts of organic acids, urea, and inorganic nitrogen compounds such as nitrates and ammonium salts. Necessary inorganic salts are potassium phosphate, sodium chloride, magnesium sulfate, etc., and the media may contain such metals as copper, manganese, cobalt, and nickel. For a large scale run a liquid medium is convenient.

The incubation of microorganisms may be effected statically but it is more advantageous to conduct it under aerobic conditions such as submerged culture under aeration with shaking or stirring.

Contact of the material steroids with the culture of microorganisms or with their enzyme is effected by bringing the mycelium separated from the culture broth or the oxidase separated from the mycelium into contact with the material steroids, or by adding the material steroids to the medium at a proper stage of the incubation. In the latter case, the material is added at once or over a period as fine powder or as a solution or suspension in a suitable solvent such as methanol, ethanol, ethylene glycol, propylene glycol, dimethylformamide, dioxane, and water, or as a solution or suspending containing a surface active agent or a dispersing agent. The pH of the substrate solution, incubation temperature, incubation time, and other conditions are different depending on the kind and quantity of the starting steroids and the kind of the microorganisms used, and therefore optimal conditions are selected in each case. In general, however, the incubation is conducted at pH 6–9, 25–30° C. for 3–50 hours, but these conditions are not necessarily specific.

According to the kind of microorganisms, their activities are different. If the incubation is carried out too long, using a strain of a micoorganism with strong activity, the $\Delta^1$-dehydrosteroids once accumulated are decomposed resulting in a poor yield. Therefore, the most important factor for obtaining good yield of $\Delta^1$-dehydrosteroids is incubation time, and in general less than 24 hours is preferable.

The $\Delta^1$-dehydrosteroids thus accumulated in the culture broth can be separated by various methods. For example, they are first adsorbed on a proper adsorbent such as alumina, magnesium silicate, or active carbon and then eluted with a suitable solvent such as methanol or ethanol, or directly extracted with a solvent immiscible with water such as chloroform, methylene chloride, or ethylene chloride, or subjected to counter current distribution. Or they are separated by chromatography using alumina, silica gel, cellulose, or pulp as carrier, or utilizing their difference in solubility in various solvents, or leading them to their functional derivatives wth Girard reagent T or P or with a lower aliphatic acid anhydride and a deacidating agent.

The products of the present invention, $\Delta^1$-dehydrosteroids are useful, for example, as medicines having activities of cortical hormones and/or sexual hormones, or as intermediates for producing such medicines.

*Example 1*

A solution of 15 g. of polypeptone, 7.5 g. of meat extract, and 3 g. of $KH_2PO_4$ in 1.5 l. of tap water is adjusted to pH 7.0 to prepare a nutrient medium.

A 75 cc.-portion of the nutrient medium is poured into each of twenty culture flasks and is sterilized by heating under 1.5 atmospheres, pressure for 15 minutes. A strain of Micrococcus sp. IFO No. 3769 is inoculated into each medium and incubated at 28° C. for 20 hours, with shaking when the microorganism grows sufficiently. Then a solution of 5 mg. of $\Delta^4$-pregnene-11$\beta$,17$\alpha$,21-triol-3,20-dione in 0.5 cc. of dioxane is added to each medium and the incubation is continued for additional 24 hours under the same conditions. The culture broths are combined and extracted four times with 500 cc.-portions of ethyl acetate, and the extract is evaporated under reduced pressure, leaving a brown residue. The residue is dissolved in a little methylene chloride, the solution is poured on a column packed with synthetic magnesium silicate, and the column is eluted with a mixture of methylene chloride and ethyl acetate. The fraction containing the desired product, $\Delta^{1,4}$-pregnadiene-11$\beta$,17$\alpha$-21-triol-3,20-dione, is separated and evaporated, and the residue is recrystallized from ethyl acetate to give 52 mg. of $\Delta^{1,4}$-pregnadiene-11$\beta$,17$\alpha$,21-triol-3,20-dione.

The strain used in this example is deposited in Institute for Fermentation, Osaka, and ATCC with numbers of IFO–3769 and ATCC–13553, respectively.

*Example 2*

A 100 mg.-portion of $\Delta^4$-pregnene-11$\beta$,17$\alpha$,21-triol-3,20-dione is oxidized with a strain of Micrococcus sp. IFO No. 3770 and treated in the same manner as in Example 1 to give a crude product. The crude product is dissolved in 100 cc. of methanol and the solution is decolorized with 1.0 g. of active carbon and evaporated, giving 68 mg. of $\Delta^{1,4}$-pregnadiene-11$\beta$,17$\alpha$,21-triol-3,20-dione.

The strain used in this example is deposited in Institute for Fermentation, Osaka, and ATCC with numbers of IFO–3770 and TACC–13554, respectively.

*Example 3*

A strain of Micrococcus sp. IFO No. 3770 is inoculated into 500 cc. of the same nutrient medium as in Example 1 in each of four culture flasks and incubated at 28° C. for 24 hours with shaking. Then a solution of 100 mg. of $\Delta^4$-pregnene-11$\beta$,17$\alpha$,21-triol-3,20-dione in 4 cc. of dioxane is added to each medium and the incubation is continued for additional 24 hours. The culture broths are combined and treated as in Example 1 to give 208 mg. of $\Delta^{1,4}$-pregnadiene-11$\beta$,17$\alpha$,21-triol-3,20,-dione.

*Example 4*

A 100 mg.-portion of $\Delta^4$-pregnene-11$\beta$,17$\alpha$,21-triol-3,20-dione is oxidized with a strain of Micrococcus sp. IFO No. 3771 and treated as in Example 1 to give 46 mg. of $\Delta^{1,4}$-pregnadiene-11$\beta$,17$\alpha$,21-triol-3,20-dione.

The strain used in this example is deposited in Institute for Fermentation, Osaka, and ATCC with numbers of IFO–3771 and ATCC–13555, respectively.

The above examples represent presently-preferred illustrative embodiments of the invention, and in these examples, "cc." stands for cubic centimeters, "g." stands for grams, "mg." for milligrams, and "l." for liters.

This application is a division of application S.N. 834,-415, filed Aug. 18, 1959, now U.S. Patent 3,056,731.

Having thus disclosed the invention what is claimed is:

1. A process for converting a compound selected from the group consisting of steroids of the pregnane and androstane series in which at least the positions 1 and 2 are saturated, into the corresponding $\Delta^1$-dehydrosteroid, which comprises bringing said compound into contact with an enzyme system of an oxidase-producing microorganism selected from the group consisting of Micrococcus sp. ATCC No. 13553 (IFO No. 3769), Micrococcus sp. ATCC No. 13554 (IFO No. 3770) Micrococcus sp. No. 13555 (IFO No. 3771) and *Micrococcus roseus* Flügge.

2. The process claimed in claim 1, wherein the starting steroid compound is selected from the group consisting of pregnane-3,20-dione, $\Delta^{4,11}$-pregnadiene-3,20-dione, $\Delta^4$-pregnene-3,20-dione, $\Delta^4$-pregnen-11-ol-3,20-dione, $\Delta^4$-pregnen-12-ol-3,20-dione, $\Delta^4$-pregnen-14-ol-3,20-dione, $\Delta^4$-pregnen-17-ol-3,20-dione, $\Delta^4$-pregnen-21-ol-3,20-dione, $\Delta^4$-pregnen-14-ol-3,11,20-trione, $\Delta^4$-pregnen-17-ol-3,11,20-trione, $\Delta^4$-pregnen-21-ol-3,11,20-trione, $\Delta^4$-pregnene-17,21-diol-3,20-dione, $\Delta^4$-pregnene-17,21-diol-3,11,20-trione, $\Delta^4$-pregnene-11,21-diol-3,20-dione, $\Delta^4$-pregnene-11,17,21-triol-3,20-dione, $\Delta^4$-pregnene-11,16,17,21-tetrol-3,20-dione, 6-(di)fluoro-$\Delta^4$-pregnene-11,17,21-triol-3,20-dione, 9-(di)fluoro-$\Delta^4$-pregnene-11,17,21-triol-3,20-dione, 6-methyl-$\Delta^4$-pregnene-17,21-diol-3,11,20-trione, $\Delta^4$-pregnene-17,19,21-triol-3,20-dione, $\Delta^4$-pregnene-11,20,21-triol-3-one, allopregnane-3,20-dione, androstane-3,17-dione, $\Delta^4$-androsten-17-ol-3-one, $\Delta^4$-androstene-3,17-dione, $\Delta^5$-androstene-3,17-dione, and $\Delta^4$-androstene-3,11,17-trione.

3. A process for converting $\Delta^4$-pregnene-11,17,21-triol-3,20-dione into $\Delta^{1,4}$-pregnadiene-11,17,21-triol-3,20-dione, which comprises bringing the former into contact with an enzyme system of Micrococcus sp. ATCC No. 13553 (IFO No. 3769), whereby a double bond is introduced between the positions 1 and 2 to yield the said $\Delta^{1,4}$-compound.

4. A process for converting $\Delta^4$-pregnene-11,17,21-triol-3,20-dione into $\Delta^{1,4}$-pregnadiene-11,17,21-triol-3,20-dione, which comprises bringing the former into contact with an enzyme system of Micrococcus sp. ATCC No. 13554 (IFO No. 3770), whereby a double bond is introduced between the positions 1 and 2 to yield the said $\Delta^{1,4}$-compound.

5. A process for converting $\Delta^4$-pregnene-11,17,21-triol-3,20-dione into $\Delta^{1,4}$-pregnadiene-11,17,21-triol-3,20-dione, which comprises bringing the former into contact with an enzyme system of Micrococcus sp. No. 13555 (IFO No. 3771), whereby a double bond is introduced between the positions 1 and 2 to yield the said $\Delta^{1,4}$-compound.

6. A process for converting $\Delta^4$-pregnene-11,17,21-triol-3,20-dione into $\Delta^{1,4}$-pregnadiene-11,17-21-triol-3,20-dione, which comprises bringing the former into contact with an enzyme system of *Micrococcus roseus* Flügge, whereby a double bond is introduced between the positions 1 and 2 to yield the said $\Delta^{1,4}$-compound.

References Cited in the file of this patent
UNITED STATES PATENTS
2,905,592     Skull et al. _____ Sept. 22, 1959